United States Patent Office 3,817,819
Patented June 18, 1974

3,817,819
FIBROUS INSERT FOR REINFORCING FOAM PLASTIC PRODUCTS AND PROCESS FOR THE PRODUCTION OF THESE FOAM PLASTIC PRODUCTS
Peter Hoppe, Troisdorf, Gustav Drouven, Bensberg-Moitzfeld, and Johann Muller, Leverkusen, Germany, assignors to Bayer Aktiengesellschaft, Leverkusen, Germany
Continuation-in-part of abandoned application Ser. No. 853,425, Aug. 27, 1969. This application Nov. 26, 1971, Ser. No. 202,197
Claims priority, application Germany, Oct. 18, 1968, P 18 03 790.6
Int. Cl. B32b 3/14
U.S. Cl. 161—140         2 Claims

ABSTRACT OF THE DISCLOSURE

Crash pads or the like essentially composed of a polymeric foam material and randomly disposed therethrough a nonwoven fabric of substantially continuous filaments.

---

This application is a continuation in part of Application Ser. No. 853,425 filed Aug. 27, 1969, now abandoned.

This invention relates to foam form articles. It more particularly refers to such articles which are used as crash pads or other structures having shock absorbing, foam-form components.

It is known to utilize foam-form shaped articles, such as polyurethane foam articles of appropriate shape, as crash pads for automobile dash boards and the like. It is also known to utilize such foam-form materials in structures where the foam is a core which is covered by other rigid or flexible materials such as sheet metal, solid plastic, fiber reinforced plastic, ply woods etc. Such foams as form crash pads generally have densities of about 100 to 800 kg./m.³, while such foams as are used in sandwich construction are more generally rigid and have a density of about 60 to 100 kg./m.³.

Where flexible foams are used, they tend to absorb input shock by means of their resiliency and compression. Rigid foams however break, upon being subjected to input compression shock, in a brittle manner and therefore have the capacity to absorb very little if any shock.

It is known to reinforce foam-form articles as well as non-foam form plastic articles by incorporating reinforcing fibers or filaments therein. This type of reinforcing is conventionally used to improve the tensile strength properties of such plastic materials. It is known to produce these fiber reinforced plastics by admixing the fibers with a moldable plastic and then molding the admixture, or by forming a three dimensional fiber structure corresponding generally to the shape of the final desired product and then foaming the plastic through the interstices at the fibrous preform. It has been the practice to make these fibrous preforms of a multiplicity of very short fibers, usually glass fibers, of about 5 to 10 cm. in length.

Such fibrous preforms were made by relatively conventional non-woven fabric production techniques in which the fibers are formed, in a geometrically random distribution and orientation, into an appropriate size and shape; and are then bonded together in this size and shape to an extent sufficient to stabilize them in this size and shape.

After the plastic foaming process was carried out, the final reinforced foam plastic product had a high bulk density of about 750 to 900 kg./m.³. However, these products suffered from the distinct disadvantage that the individual fibers had very little effect upon the tensile strength of the product because of their rather short length. Further, it was impossible or at least substantially impossible to produce very bulky products of lower density, by foaming in situ, that is products having ratios of all three dimensions to each other of about 1:1:1 with a thickness of at least 3 cm. to about 5:5:1.

Further, it has been found that foam-form plastics of relatively high bulk reinforced with a fibrous structure composed of short or stable length fibers showed a shiver or vibration effect when subjected to sudden compressive forces (shock) which is quite undesirable in a crash pad or other shock absorbing device.

It is therefore an important object of this invention to provide a novel fiber reinforced, bulky foam plastic structure which is more readily capable of absorbing crash type of shock than have similar articles in the past.

Another object of this invention is to provide a more resilient and more dimensionally stable foam form material than has been available in the past.

Other and additional objects of this invention will become apparent from a consideration of this entire specification including the claims and drawing hereof.

When considering this invention, one must understand that the production of a fiber reinforced foam articles of high bulk is to be distinguished from the production of a relatively thin film or sheet form article. Neither are the same problems encountered nor are the same solutions to these problems applicable. The high bulk articles to which the instant invention is directed are those whose overall dimensions are at least in a ratio of about 1:1:1 to 100:100:1 to 100:100:20 with a thickness of at least 30 cm.

In accord with and fulfilling these objects, one aspect of this invention lies in the production of a bulky shaped article by forming a non-woven fabric of substantially continuous filaments generally corresponding to the shape and size of the final article desired; bonding this bulky nonwoven fabric of continuous filaments together predominantly at the intersection of crossing filaments or portions thereof to an extent at least sufficient to stabilize the bulky structure and give is sufficient dimensional stability to stand up to it being impregnated with and enveloped in plastic foam without significantly varying its dimensions; and foaming a plastic material in, through and around the continuous filament preform, and within a suitable shaped molding means to form the finished bulky, filament reinforced plastic foam product.

Understanding of this invention will be facilitated by reference to the accompanying drawing in which.

Figure 1:
FIG. 1 is a photograph of an unreinforced foam test article after having been subjected to a crash test.
Figure 2:
FIG. 2 is a photographic of a foam article reinforced with filaments according to this invention after having been subjected to a crash test.
Figure 3:
FIG. 3 is similar to FIG. 2 but showing a sandwich or composite article.
Figure 4:
FIG. 4 is similar to FIG. 2 but showing a foam body reinforced with short fibers.
Figure 5A:
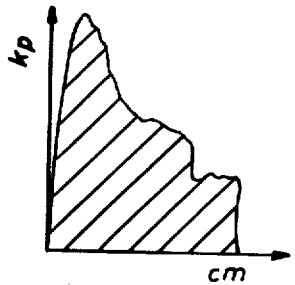
FIG. 5a is a power-distance relation curve recording the deformation of an article as shown in FIG. 3.
Figure 5B:
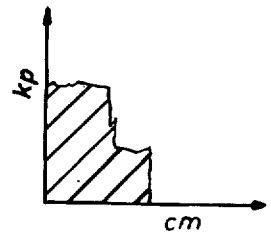
FIG. 5b is similar to FIG. 5a but for the article of FIG. 1.

By endless filaments are meant filaments which are as long as the processing techniques and the size of the fibrous insert produced therefrom allow. Such filaments are normally obtained in the production of fibres and are available commercially. It may be assumed, however, that an endless filament has a length of at least 100 metres. It is to be understood, of course, that the filaments may also be produced directly from the melt as endless filaments by means of a spinneret step before formation of the fibrous insert.

The thickness of the filaments is of the order of 5 to 100 denier, depending on the intended use to which the filaments are to be put and the stresses to which they will be subjected. If several endless filaments are to be used together, one may, of course, use filaments of different thicknesses and/or of different materials. To improve the bond between the filaments and foam plastic, it is advisable to use not only those filaments with a smooth surface but also those with a structured surface.

The percentage by weight of filaments in proportion to the total weight of the finished reinforced foam plastic may vary between 5% and 50% depending on the purpose and the chosen bulk density of the foam plastic.

Inorganic materials suitable for the filaments are, for example, metal, carbon or glass. Polyamide, polyacrylonitrile, acetyl cellulose, polyesters or their combinations are suitable examples of organic materials of which the filaments of this invention are made. The foam systems may be liquid, expansible systems based on unsaturated polyester resins, epoxy resins, phenol formaldehyde resins, polyurethanes, rubber based natural or synthetic latices, etc. Furthermore, any liquid expansible foam-forming systems which yield semi-hard or hard foams may be used.

It is often necessary for the plastic reinforced foam bodies to have local variations in the bulk density according to the different purposes for which they are intended. The invention therefore provides for a special embodiment in which the fibrous inserts also differ locally in their density and bulk according to the bulk density required. The foam finally produced will then have greater strength at these points. Moreover, mechanical binding elements or complete section reinforcements of metal, polymer materials or wood may be embedded in the fibrous insert and the foam may then be expanded through this.

The fibrous insert may be produced, e.g. as a continuous web, for example on a conveyor band and afterwards be cut up into individual pieces of the required size. One particular application lies in producing the fibrous insert as a preformed article, if necessary, of complicated three-dimensional structure for the reinforced foam product which is to be produced. This is carried out in a compression mould or suction mould conforming to the contour of the final foam product.

The purpose for the production of such foam product using the fibrous insert according to the invention is based on the fact that fibres are wetted with binder in known manner and then deposited, preferably as a preformed insert, through which a foamable liquid chemical is then foamed. The inventive feature of this process is that the fibrous insert is formed from one or more endless filaments by three-dimensional deposition. The advantages already mentioned above are achieved by this means because the endless filament or filaments are fixed by the binder at their intersecting points of contact.

The deposition may, for example, be crosswise and/or in the form of a spiral or irregularly. This deposition may be carried out automatically, both the supply of the filament and its deposition being carried out either individually or coupled.

Compared with the known process, the process according to the invention also has the special advantage that the operation of breaking up endless fibres into short fibres is eliminated.

According to a particular embodiment of the process of the invention, the filaments are deposited with localized differences in density. According to the invention, this is achieved either by producing the required density by localized and/or intermittent application of a suitable, if necessary, additional, partial vacuum to the fibrous insert which is being formed. The partial vacuum is moreover preferably variable in time and place during the process of deposition. The fibrous insert is thus sucked to the surface on which it is supported, and the subsequent filaments deposited on it form a more or less loose and bulky package. Alternatively, the invention provides for localized and/or temporary variation of the number of endless filaments used for forming the fibrous insert. In this special case, one may also use in addition shorter filaments than those described above. According to another advantageous method of carrying out the process for obtaining localized differences in the density of deposition of the endless filaments, the invention provides for the variation in place and/or time of the titre of endless filaments supplied. This is achieved, for example, by subjecting the finished filaments to a cold or hot stretching or, in the case of filaments drawn from the melt, these are subjected to stretching which varies with time. The variation in titre depends both on the type of filament material and on the required mechanical properties of the fibrous insert at the particular points of the insert.

The process provides another especially advantageous embodiment in which the finished fibrous insert is precompressed at least at certain points. This can be effected, for example, by pressing the fibrous insert between two plates so that it is fixed by heat. If only certain points of the fibrous insert are to be compressed, the plates may be appropriately contoured. The precompression may be effected by the foaming mould itself immediately before the foaming process.

What is claimed is:

1. A bulky shaped article having an overall dimension ratio of at least about 1:1:1 to 100:100:1 to 100:100:20 with the last value in the ratio being the thickness, with a thickness of at least 30 cm., consisting essentially of a mass of geometrically disarrayed continuous filaments, which form a bulky mass of filaments, which filaments are bonded together at crossing points thereof with a binder, said filaments having a denier between 5 and 100 and a length of at least 100 meters, which mass has substantially the same size and shape as said article, and foam-form plastic material in the interstices of and about said filament mass.

2. A bulky shaped article according to claim 1 wherein said foam-form plastic material is a liquid, expansible system based on a member selected from the group consisting of unsaturated polyester resins, epoxy resins, phenol-formaldehyde resins, polyurethanes, natural rubber based latices and synthetic rubber based latices, said filaments being present between 5 and 50% based upon the total weight of the finished bulky shaped article.

References Cited
UNITED STATES PATENTS

| | | | |
|---|---|---|---|
| 3,686,048 | 8/1972 | Schirtzinger | 156—161 |
| 3,669,566 | 6/1972 | Bourquardez | 161—144 |
| 3,627,603 | 12/1971 | Greig | 264—47 X |
| 3,591,444 | 7/1971 | Hoppe | 264—257 |
| 2,972,554 | 2/1961 | Muskat | 264—47 X |
| 3,382,302 | 5/1968 | Marzocchi | 264—257 |
| 3,028,284 | 4/1962 | Reeves | 264—257 |
| 3,546,060 | 12/1970 | Hoppe et al. | 264—47 X |
| 3,617,594 | 6/1969 | Willy | 264—47 X |
| 3,025,202 | 3/1962 | Morgan | 264—47 |

GEORGE F. LESMES, Primary Examiner

M. B. WITTENBERG, Assistant Examiner

U.S. Cl. X.R.

161—165; 264—47, 257